United States Patent
Chen et al.

(10) Patent No.: US 6,954,425 B2
(45) Date of Patent: Oct. 11, 2005

(54) METHOD FOR COMPENSATING FOR CLOCK SIGNAL DIFFERENCE BETWEEN A SWITCH AND A PERIPHERAL DEVICE, AND ASSOCIATED APPARATUS

(75) Inventors: Jen-Kai Chen, Taipei (TW);
Chien-Shu Tseng, Taipei (TW);
Jiann-Hwa Liou, Taichung (TW)

(73) Assignee: VIA Technologies, Inc., Taipei (TW)

(*) Notice: Subject to any disclaimer, the term of this patent is extended or adjusted under 35 U.S.C. 154(b) by 841 days.

(21) Appl. No.: 09/855,713
(22) Filed: May 16, 2001
(65) Prior Publication Data
US 2002/0034195 A1 Mar. 21, 2002

(30) Foreign Application Priority Data
May 17, 2000 (TW) ........................................ 89109495 A

(51) Int. Cl.[7] ................................................. H04J 1/16
(52) U.S. Cl. ........................ 370/229; 370/230; 370/232; 370/241; 370/252
(58) Field of Search ................................ 370/229, 230, 370/232, 241, 252

(56) References Cited
U.S. PATENT DOCUMENTS 5,930,234 A * 7/1999 Yoshida ...................... 370/232
5,995,488 A * 11/1999 Kalkunte et al. ............ 370/232
6,292,468 B1 * 9/2001 Sanderson ................... 370/241

* cited by examiner

Primary Examiner—Huy D. Vu
Assistant Examiner—Cynthia L. Davis
(74) Attorney, Agent, or Firm—Rabin & Berdo, P.C.

(57) ABSTRACT

A method for compensating for clock signal difference between a switch and peripheral device, including a receiving process and a transmitting process. For the receiving process, after an N-th packet is received, a first counter is triggered and begins to count. When an (N+1)-th packet is inputted, the counter stops counting and then an inter-packet gap IPG(N, N+1) between the N-th packet and the (N+1)-th packet is recorded into the N+1 queue link node QLN(N+1) according a counting value by the first counter; otherwise, the first counter keeps counting. For the transmitting process, after an inter-packet gap IPG(M−1, M) is obtained, and the M-th packet is transmitted, and then the second counter is triggered to begin to count. When a counted value by the second counter is equal to the clock cycle value corresponding to the inter-packet gap IPG(M−1, M), the second counter stops counting. When an inter-packet gap IPG(M, M+1) is obtained, and the (M+1)-th packet is then transmitted; otherwise, the second counter keeps counting.

22 Claims, 7 Drawing Sheets

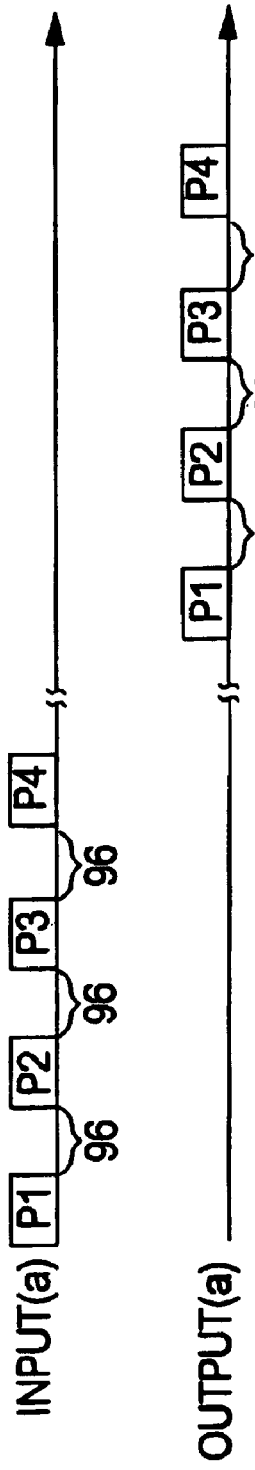
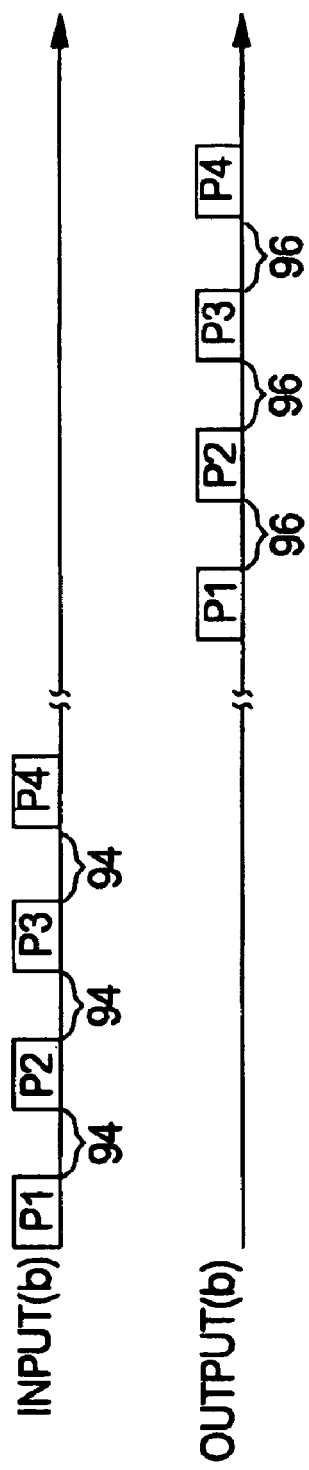
FIG. 2A (PRIOR ART)
FIG. 2B (PRIOR ART)

METHOD FOR COMPENSATING FOR CLOCK SIGNAL DIFFERENCE BETWEEN A SWITCH AND A PERIPHERAL DEVICE, AND ASSOCIATED APPARATUS

This application incorporates by reference Taiwanese application Serial No. 89109495, filed on May 17, 2000.

BACKGROUND OF THE INVENTION

1. Field of the Invention

The present invention relates to a method for compensating for clock signal difference between a switch and peripheral devices and the associated apparatus. More particularly, the present invention relates to a method for compensating for clock signal difference between a switch for an Ethernet and peripheral devices.

2. Description of the Related Art

As the internet continues to be developed, requirements of accuracy and transmission speed for transmitting data through the internet increase. Particularly, in a switch for an Ethernet system, high accuracy and transmission speed is also required.

FIG. 1 is a block diagram illustrating connections between a conventional switch and a test device. For understanding the quality of a conventional switch 100, a test device 102 is used to perform a wire-speed forwarding test to the switch 100. The test device 102 periodically outputs a number of packets to the switch 100, and then the switch 100 redirects these packets to corresponding ports according to the headers of the packets. As shown in FIG. 1, the packets out of the medium access control (MAC) unit 103 of the test device 102 is transmitted to a receive medium access control (RMAC) unit 104 of the switch 100. After being processed by the RMAC unit 104, the received packets are transmitted to an input control unit 106. The input control unit 106 is used for subsequent processing, and the processed packets are then temporarily stored in a memory 108. If the RMAC unit 104 detects errors in the received packets, it alerts the input control unit 106 to stop subsequent processing.

In addition, an output control unit 110 reads packets stored in the memory 108 and then alerts a transmit medium access control (TMAC) unit 112 to transmit the packets. The RMAC unit 104 and the TMAC unit 112 as a whole are in general called a MAC unit 114 of the switch 100.

The inter-packet gap (IPG) between two adjacent packets is at least 96 bit time in regard to the specification of the Ethernet. Furthermore, the frequency of the MAC unit 114 of the switch must be the same as that of the MAC unit 103 of the test device 102. For example, for a 100 M bps (bit per second) Ethernet system, each bit time is equal to 10 ns ($10^{-9}$ sec), and then a 50 MHz clock signal is used for both MAC units 103 and 114, wherein two bits are transmitted every RMII (Reduced Media Independent Interface) clock cycle which is essentially equal to two bit time.

First, assume that the MAC unit 103 of the test device 102 operates at a first clock domain with a frequency FRQ1 and the MAC unit 114 of the switch operates at a second clock domain with a frequency FRQ2. FIG. 2A is a schematic diagram for illustrating input and output packets of the switch when the frequencies of the MAC unit of the test device and the MAC unit of the switch are the same. For a 100 M bps Ethernet system, assume that both of the frequencies FRQ1 and FRQ2 are equal to 50 MHz and 96 bit time is equal to 48 clock cycles. After the MAC unit 103 of the test device 102 has transmitted the packet P1, packets P2, P3, and P4 are then respectively and subsequently transmitted every 48 clock cycles (the first clock domain). On the other hand, the packets P1, P2, P3, and P4 are received by the MAC unit 114 of the switch 100 and temporarily stored in a buffer (not shown) therein. Then, the packets P1, P2, P3, and P4 are respectively and subsequently transmitted to the memory 108 every 48 clock cycles (the second clock domain). As the input (a) signal shown in FIG. 2A, the IPGs of the adjacent packets of the packets P1, P2, P3 and P4 are 96 bit time.

Each IPG must be larger than or equal to 96 bit time according to the Ethernet specification and therefore, after the TMAC unit 112 reads the packet P1 from the memory 108, the packets P2, P3, and P4 are read from the memory 108 every 48 clock cycles (the second clock domain). As can be learned from output signal (a) shown in FIG. 2A, which is outputted from the memory 108 to the TMAC unit 112 in FIG. 1, each IPG of the adjacent packets of the packets P1, P2, P3 and P4 is equal to 96 bit time. Similarly, when the switch 100 transmits the packets P1, P2, P3, and P4, each IPG of the packets P1, P2, P3, and P4 is also equal to 96 bit time (the second clock domain). Because the frequency FRQ1 of the first clock domain is equal to the frequency FRQ2 of the second clock domain, each of the IPGs among the packets P1, P2, P3, and P4 transmitted from the RMAC unit 104 to the memory 108 and each of the IPGs among the packets P1, P2, P3, and P4 transmitted from the memory 108 to the TMAC unit 112 are equal. Therefore, the packets are not jammed in the memory 108, and the transmission of the packets is successful.

FIG. 2B is a schematic diagram for illustrating input and output packets of the switch when the frequencies of the MAC unit of the test device and the MAC unit of the switch are not equal. According to the Ethernet specification, a frequency tolerance between −100 ppm to +100 ppm (1 ppm=$10^{-6}$) is allowed. As an example, when a maximum frequency tolerance of 200 ppm occurs for an Ethernet system having a frequency of 100 MHz between the MAC unit 114 of the switch 100 and the MAC unit 103 of the test device 102, the frequencies FRQ1 and FRQ2 can be respectively (1+100 ppm)×50 MHz and (1−100 ppm)×50 MHz.

TABLE I shows the IPG probability for different packet sizes when the difference between the frequencies FRQ1 and FRQ2 is 200 ppm.

TABLE I

| Packet size (byte) | 64 | 512 | 1024 | 1518 |
|---|---|---|---|---|
| Byte accumulation | 0.1344 | 0.8512 | 1.6704 | 2.4608 |
| Probability (IPG = 96) | 0.9328 | 0.5744 | 0.1648 | 0 |
| Probability (IPG = 94) | 0.0672 | 0.4256 | 0.8352 | 0.7696 |
| Probability (IPG = 92) | 0 | 0 | 0 | 0.2304 |
| Packet number for IPG = 94 | 14.8810 | 2.34962 | 1.19732 | |
| Packet number for IPG = 92 | | | | 2.17014 |

Take the packet size of 64 byte as an example. After the MAC unit 103 of the test device 102 transmits the packet P1, the packets P2, P3, and P4 are consecutively transmitted every 48 clock cycles (the first clock domain). After the MAC 114 of the switch 100 receives the packets P1, P2, P3, and P4, they are temporarily stored in a buffer (not shown) of the RMAC unit 104 and then respectively transmitted to the memory 108.

As shown in TABLE I, because frequencies FRQ1 and FRQ2 are different, the speed of transmitting the packets from the RMAC unit 104 to the memory 108 is lower than that of transmitting the packets from the test device 102 to the RMAC unit 104. Accordingly, the packets accumulate in the buffer of the RMAC unit 104. For example, from TABLE I, 0.1344 bit accumulate in the buffer of the RMAC unit 104 for transmitting a 64-byte packet. Therefore, two bits are accumulated in the buffer of the RMAC unit 104 after 14.8810 64-byte packets are transmitted.

In order to prevent the received packets from accumulating in the buffer of the RMAC 104, the IPG has to be reduced by two bit time after each 14.8810 64-byte packets are transmitted. As shown in FIG. 2B, the input signal (b) transmitted from RMAC unit 104 to the memory 108, the IPG between the packets P2 and P3 is 94 bit time. Namely, the RMAC unit 104 reduces the IPG between the packets P2 and P3 to 94 bit time and then transmits them to the memory 108. As shown in TABLE I, the probability that the RMAC unit 104 reduces the IPG between the packets to 94 bit time and then transmits them to the memory 108 is 0.0672.

Since, according to the Ethernet specification, each IPG must be larger than or equal to 96 bit time, after the TMAC unit 112 read the packet P1 from the memory 108, the packets P2, P3, and P4 are read from the memory 108 every 48 clock cycles (the second clock domain). As can be learned from output signal (b) as shown in FIG. 2A, which is outputted from the memory 108 to the TMAC unit 112 in FIG. 1, each IPG of the adjacent packets of the packets P1, P2, P3, and P4 outputted from the memory 108 is equal to 96 bit time. Similarly, when the switch 100 transmits the packets P1, P2, P3, and P4, in which the corresponding IPGs are also equal to 96 bit time (the second clock domain).

However, because the frequency FRQ1 of the first clock domain and the frequency FRQ2 of the second clock domain are not equal, the sum of all IPGs of the adjacent packets of the packets P1, P2, P3, and P4 from the RMAC unit 104 to the memory 108 is less than that of all IPGs of the packets P1, P2, P3 and P4 from the memory 108 to the TMAC unit 112. Namely, the speed for storing the packet into the memory 108 is larger than that for reading the packet from the memory 108. An overflow is occurred in the memory 108 of the switch 100. Therefore, the subsequent packet cannot be continuously transmitted to the memory 108 so as to lose data. To avert this, a flow control unit 116 of the switch 100 has to be triggered to delay the data transmission so as to reduce transmission rate for the network.

Another example of switch is described in U.S. Pat. No. 5,719,862 to Raymond K. Lee, et al. In this technique, dynamic de-skewing is performed for each packet in a switch and each data packet transmitted through the switch is compensated for skew by measuring the skew of the start flag transmitted with the data packet.

SUMMARY OF THE INVENTION

Therefore, it is an objective of the present invention to provide a method for compensating for clock signal difference between switch and peripheral device, and an associated apparatus. By the invention, the problem of data loss due to memory overflow as occurred in the conventional method is resolved. In addition, transmission speed of the network is increased.

According to the object of the invention, it provides a method for compensating for clock signal difference between a switch and a peripheral device. The switch includes a first counter and a second counter, and the switch is used for receiving and transmitting a plurality of packets, wherein each of the packets corresponds to a queue link node of the packet, an N-th packet corresponds to an N-th queue link node QLN(N), and an M-th packet corresponds to an M-th queue link node QLN(M), where N and M are integrals. The method includes a receiving process and a transmitting process. The receiving process includes the steps as follows. (a) The N-th packet is received. (b) The first counter is triggered. (c) A counting operation is performed by the first counter. (d) When an (N+1)-th packet is inputted to the switch, the process proceeds to step (e); otherwise the receiving process proceeds to step (c). (e) The first counter is stopped, and an inter-packet gap IPG(N, N+1) between the N-th packet and the (N+1)-th packet is recorded into the (N+1)-th queue link node QLN(N+1) according to a counting value of the first counter. (f) N is increased by one and then steps (b) to (f) are repeated.

The transmitting process includes steps as follows. (a1) The M-th queue link node QLN(M) corresponding to the M-th packet is read for obtaining an inter-packet gap IPG (M−1, M), and then the M-th packet is transmitted. (b1) The second counter is triggered. (c1) A counting operation is performed by the second counter. (d1) The second counter counts until the counting value is equal to the clock cycle value corresponding to the inter-packet gap IPG(M−1, M); otherwise, step (c1) is repeated. (e1) An (M+1)-th queue link node QLN(M+1) corresponding to an (M+1)-th packet is read for obtaining an inter-packet gap IPG(M, M+1), and then the (M+1)-th packet is transmitted. (f1) M is increased by one and then steps (c1) to (f1) are repeated.

According to the invention, it provides an apparatus for transceiving a plurality of packets, wherein each of the packets corresponds to a queue link node, an N-th packet corresponds to an N-th queue link node QLN(N), and an M-th packet corresponds to an M-th queue link node QLN (M), where N and M are integrals. The apparatus includes a first counter, a second counter, a receive media access control (RMAC) unit, and a transmit media access control (TMAC) unit. The RMAC unit is used for receiving the packets, wherein the RMAC unit is used for triggering the first counter to obtain an inter-packet gap IPG(N, N+1) between the N-th packet and the (N+1)-th packet, and then recording the inter-packet gap IPG(N, N+1) into an (N+1)-th queue link node QLN(N+1). The TMAC unit is used for transmitting the packets, wherein the TMAC unit is used for reading the M-th queue link node QLN(M) corresponding to the M-th packet for obtaining an inter-packet gap IPG(M−1, M), and then transmitting the M-th packet, and then triggering the second counter, wherein when a counted value by the second counter is equal to a clock cycle value corresponding to the inter-packet gap IPG(M−1, M), an (M+1)-th queue link node QLN(M+1) corresponding to an (M+1)-th packet is read for obtaining an inter-packet gap IPG(M, M+1), and then the (M+1)-th packet is transmitted.

BRIEF DESCRIPTION OF THE DRAWINGS

Other objects, features, and advantages of the invention will become apparent from the following detailed description of the preferred but non-limiting embodiments. The description is made with reference to the accompanying drawings in which:

FIG. 2A (Prior Art) is a schematic diagram for illustrating input and output packets of the switch when the frequencies of the MAC unit of the test device and the MAC unit of the switch are the same;

FIG. 2B (Prior Art) is a schematic diagram for illustrating input and output packets of the switch when the frequencies of the MAC unit of the test device and the MAC unit of the switch are not the same;

DESCRIPTION OF THE PREFERRED EMBODIMENT

Figure 1:
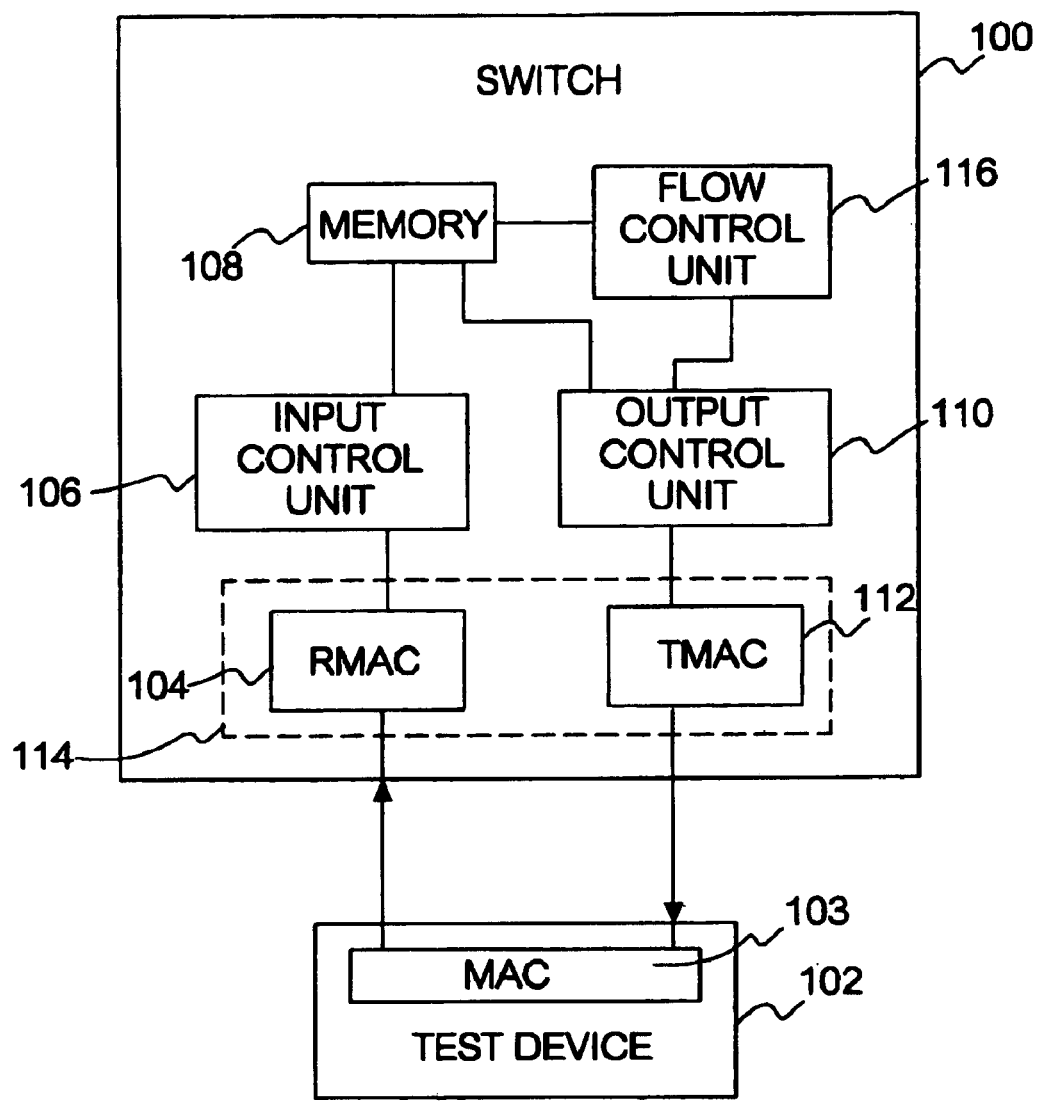
FIG. 1 (Prior Art) is a block diagram illustrating connections between a conventional switch and a test device.
Figure 3:
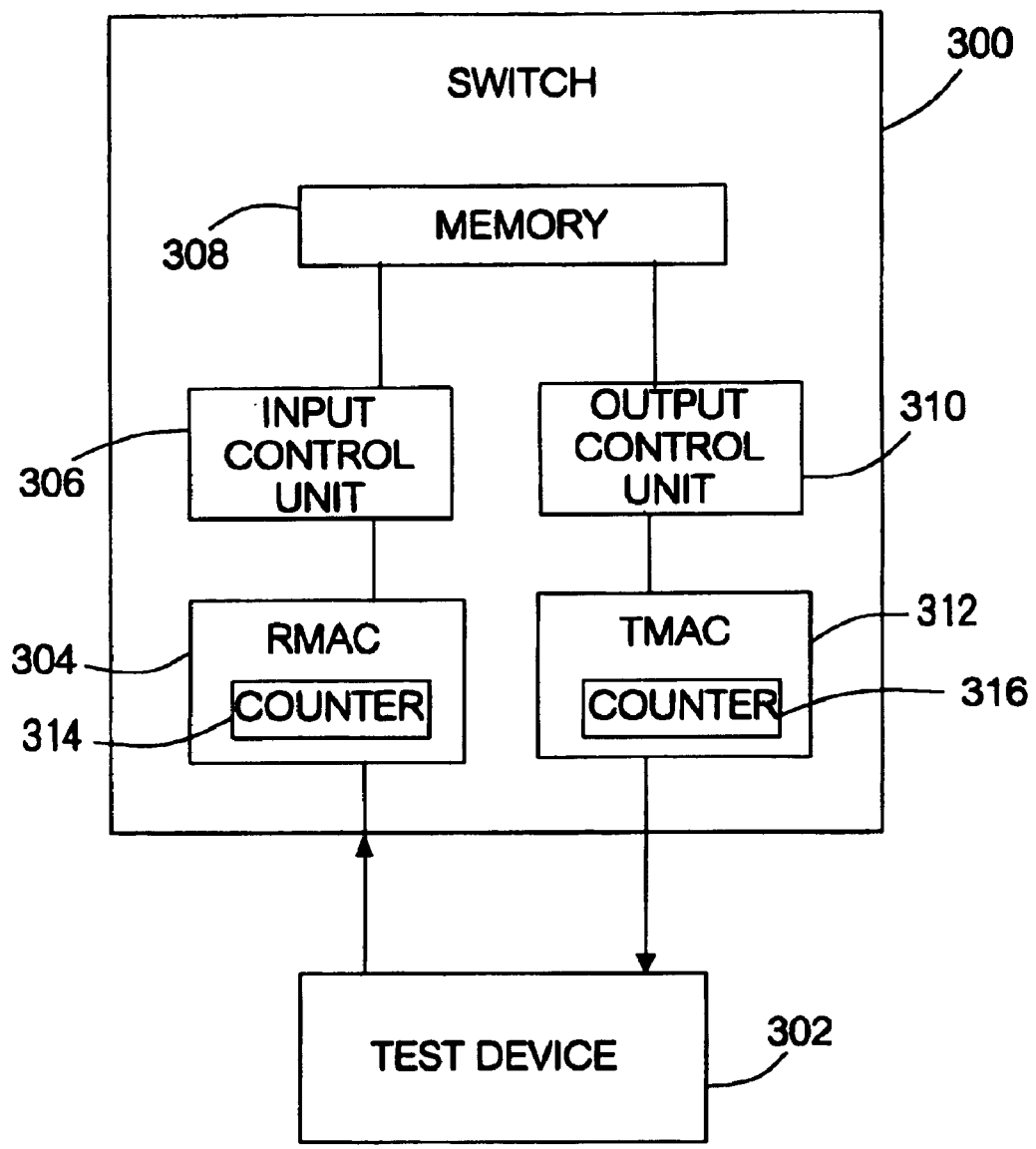
FIG. 3 is a schematic block diagram showing connection between a switch and a test device according to one preferred embodiment of the present invention.

Referring to FIG. 3, the switch 300 consecutively receives a number of packets in an equal-spacing manner from the test device 302. After being processed by a receive medium access control (RMAC) unit 304 and an input control unit 306 in the switch 300, the received packets are temporarily stored in a memory 308. Thereafter, an output control unit 310 reads the packets from the memory 308 and then transmits them to the test device via a transmit medium access control (TMAC) unit 312. The RMAC 304 and TMAC 312 further include counters 314 and 316 respectively.

After the switch 300 receives the packets, it generates a corresponding queue link node for each packet for recording a packet size, a port to which the packet is transmitted, and a memory address storing the next transmitted packet. As the packet is transmitted out of the switch 300, the corresponding queue link node is cancelled.

Figure 4A:
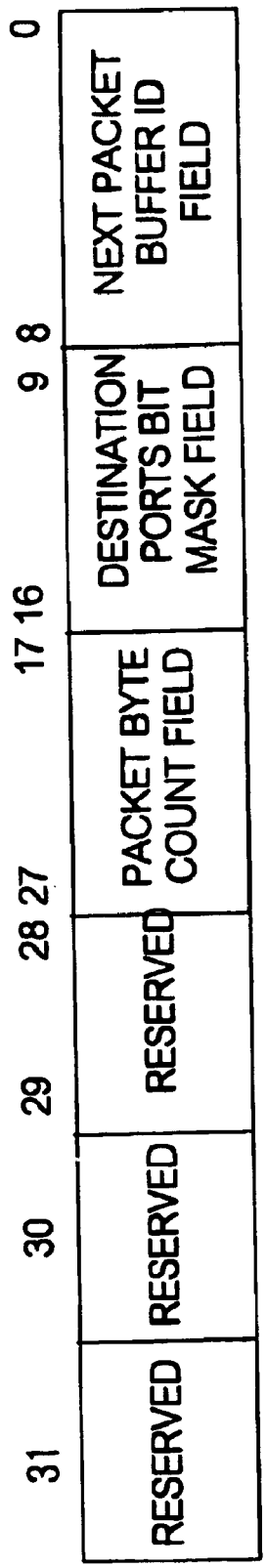
FIG. 4A shows a data structure of a conventional queue link node.
Figure 4B:
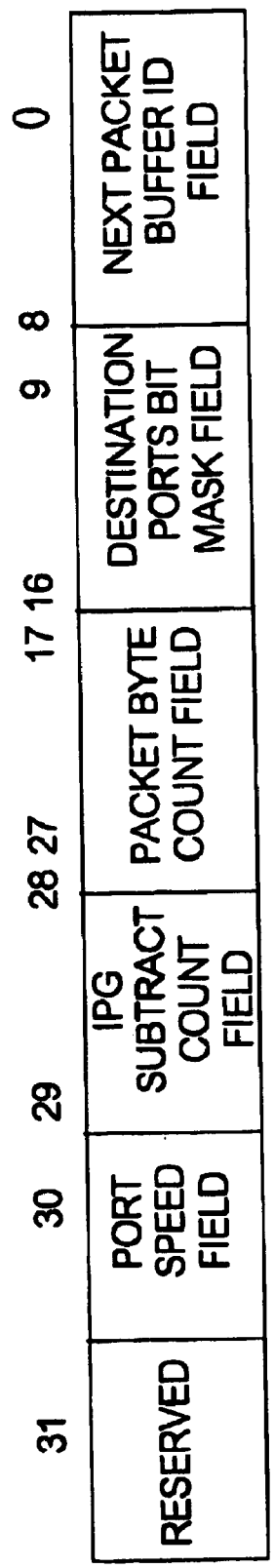
FIG. 4B is a schematic data structure of a queue link node according to one preferred embodiment of the present invention.

FIG. 4A shows a data structure of a conventional queue link node, and FIG. 4B is a schematic data structure of a queue link node according to one preferred embodiment of the present invention. Referring to FIG. 4A, the conventional queue link node includes three fields, the next packet buffer ID, destination ports bit mask, and packet byte count. The content for each field is described as follows.

(1) Next packet buffer ID field: it records a buffer ID of a next transmitted packet, including 9 bits.

(2) Destination ports bit mask field: it records at least one destination port corresponding to a transmitted packet, including 8 bits.

(3) Packet byte count field: it records a size of a corresponding packet, including 11 bits.

The other bits of the conventional queue link node are reserved.

According to the present invention, two additional new fields are added to the queue link node for solving prior art problems of memory congestion and data loss due to errors caused by different frequencies of the MAC unit 114 of the switch 100 and the MAC unit 103 of the switch 102. As shown in FIG. 4B, according to the preferred embodiment of the present invention, in addition to the three conventional fields, the queue link node of the present invention further includes an IPG subtract count field and a port speed field. The contents of the two new additional fields are described as follows.

(1) IPG subtract count field: An inter-packet gap (IPG) between the current packet and the previous packet is recorded in a queue link node corresponding to the current packet. In order to minimize the required bits for record, the 96 bit time minus the clock cycle value corresponding to the bit time between the current packet and the previous packet is recorded in the IPG subtract count field. Because the IPG can be 96, 94 or 92 bit time, the clock cycle values corresponding to the differences among the 96 bit time and 96, 94 or 92 bit time are respectively 0, 1, and 2. Therefore, only two bits are required for recording the corresponding clock cycle value in the IPG subtract count field.

(2) Port speed field: It records a speed of a source port where a packet comes from. For example, the speed can be 100 M bps or 10 M bps. This field includes one bit.

When a packet is transmitted to the RMAC unit 304, the counter 314 counts the clock cycle value corresponding to an IPG between the current packet and the previous packet. Then, the counted clock cycle value are subtracted by the clock cycle value corresponding to the 96 bit time and the result is recorded in the IPG subtract count field. When the packet is transmitted the TMAC unit 316, an IPG corresponding to the clock cycle value recorded in the IPG subtract count field is used as the IPG of the current packet and the next packet. The next packet is transmitted after the IPG passes when the TMAC unit 316 transmits the current packet. Therefore, memory congestion or data loss that has occurred in the conventional method can be avoided.

Furthermore, the source port speed of the packet recorded in the port speed field is used for determining whether the procedure of the present invention is carried out. The present invention is suitable when the speed of the source port and the destination port are the same, such as of both are 100 M bps or 10 M bps.

The source port speed of the packet can be obtained by other suitable ways and not restricted to the port speed field.

Figure 5:
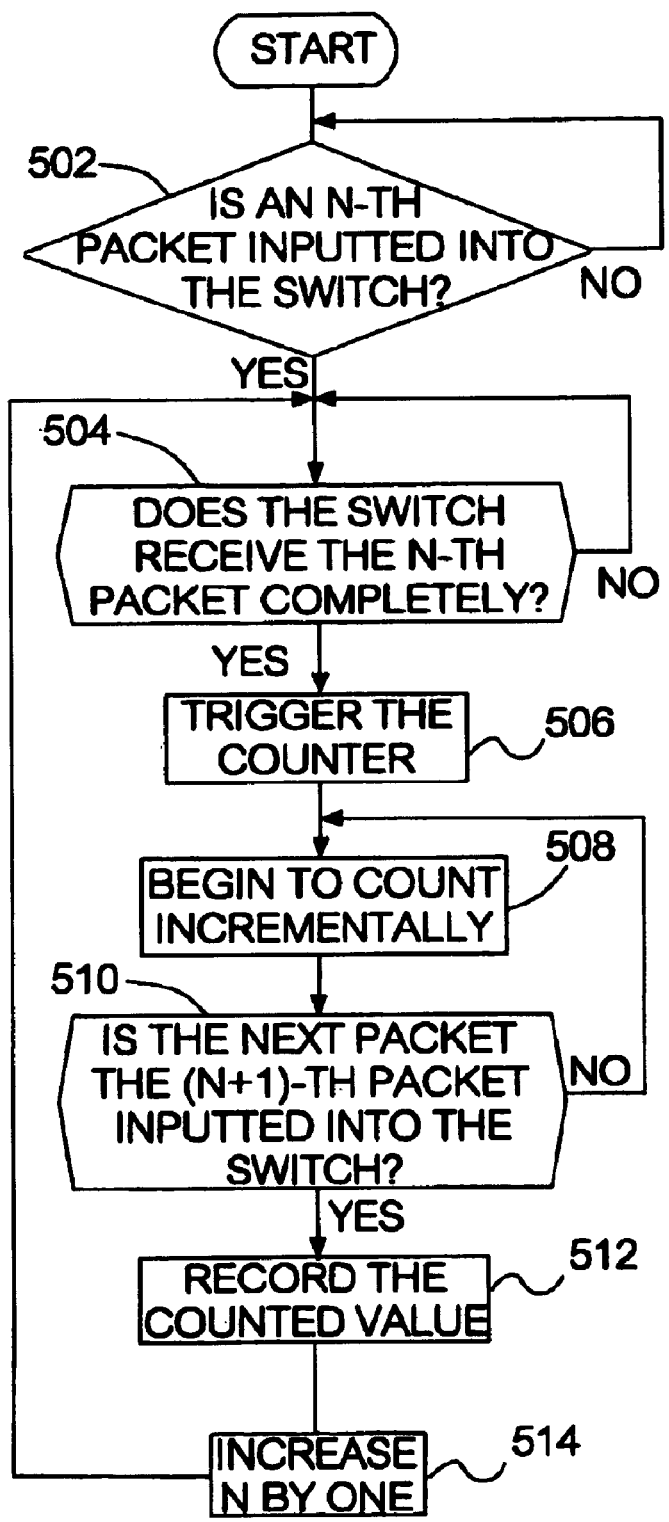
FIG. 5 is a flow chart for illustrating operations of the RMAC unit according to the preferred embodiment of the present invention.

FIG. 5 is a flow chart for illustrating operations of the RMAC unit according to the preferred embodiment of the present invention. As shown, in step 502, it is determined whether an N-th packet is inputted to the switch 300. If not, the method returns to step 502; otherwise, it proceeds to step 504. In step 504, the switch 300 continuously receives the N-th packet and determines whether the switch 300 completes receiving the N-th packet. If so, then the method proceeds to step 506; otherwise, step 504 is repeated.

In step 506, the counter 314 of the RMAC unit 304 is triggered and the counter 314 is reset. Next, step 508 is executed where the counter 314 begins to count incrementally. Then, step 510 is executed to determine whether a next packet, an (N+1)-th packet, is inputted to the switch 300. If so, the method proceeds to step 512; otherwise step 508 is repeated. In step 512, the counter 314 stops counting and records its counting value. The method then proceeds to step 514 to increase N by one and then return to step 504.

In step 512, the value in the counter 314 is an IPG(N, N+1) between the N-th and the (N+1)-th packets. The IPG(N, N+1) counted by the counter 314 in step 512 is recorded in the queue link node QLN(N+1) corresponding to the (N+1)-th packet. In order to reduce the required bits recorded in the queue link node QLN(N+1), the clock cycle value corresponding to the 96 bit time minus the IPG(N, N+1) are recorded in the IPG subtract count field of the QLN(N+1). However, in practice, there are many methods for recording the IPG subtract count. For example, the IPG(N, N+1) can be directly recorded in the queue link node QLN(N+1) corresponding to the (N+1)-th packet. The IPG (N, N+1) in the queue link node QLN(N+1) and the (N+1)-th packet are transferred in the switch 300.

According to the Ethernet protocol, two bits are transmitted in one RMII clock cycle, and therefore the 96 bit time is equivalent to 48 clock cycles. When the counter 314 counts up to 47, which is equal to 94 bit time, the IPG subtract count is 1. And when the counter 314 counts up to 46, which is equal to 92 bit time, the IPG subtract count is 2.

Figure 6:
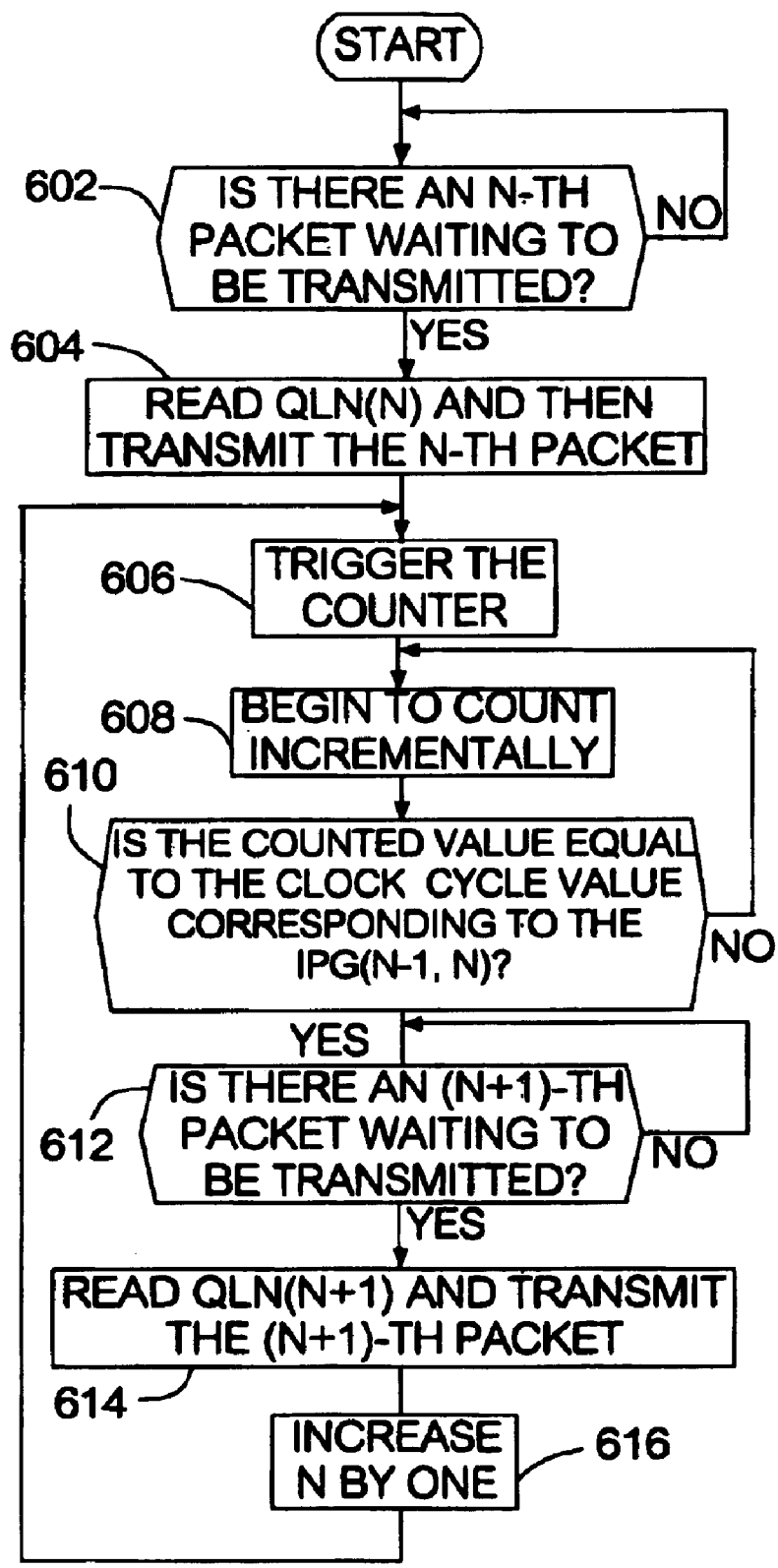
FIG. 6 is a flow chart for illustrating operations of the TMAC unit according to the preferred embodiment of the present invention.

FIG. 6 is a flow chart for illustrating the operations of the TMAC unit according to the preferred embodiment of the present invention. First, the method proceeds to step 602 to determine whether an N-th packet is to be transmitted from the switch 300. If not, step 602 is repeated; otherwise, the method proceeds to step 604. In step 604, the IPG subtract count field of the queue link node QLN(N) corresponding to the N-th packet is read and then the N-th packet is transmitted. Because the IPG subtract count field of the queue link node QLN(N) records the clock cycle value corresponding to the difference between the 48 clock cycles, which is equal to 96 bit time, and the IPG(N−1, N), the IPG(N−1, N) can then be easily calculated.

In step 606, a counter 316 of the TMAC unit 312 is triggered and the counter 316 is reset. In step 608, the counter 316 begins to count incrementally. Next, in step 610 it is determined whether the counted value by the counter 316 is equal to the clock cycle value corresponding to the IPG(N−1, N). If so, the method proceeds to step 612; otherwise returns to step 608 is repeated.

In step 612, it is determined whether there is an (N+1)-th packet waiting to be transmitted. If not, step 612 is repeated; otherwise the method proceeds to step 614. In step 614, the counter 316 stops counting. In addition, in step 614, the queue link node QLN(N+1) corresponding to the next packet, i.e. the (N+1)-th packet, is read, the IPG (N, N+1) is calculated from the IPG subtract count field of the queue link node QLN(N+1), and the (N+1)-th packet is then transmitted. Next, in step 616, N is increased by one and step 606 is repeated.

Figure 7:
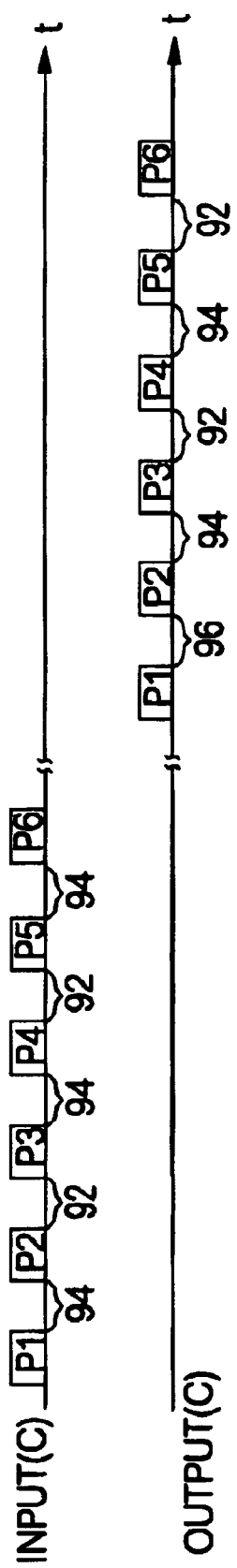
FIG. 7 is a time sequence for showing an input packet of the RMAC unit and an output packet of the TMAC unit of a switch according to one preferred embodiment of the present invention.

FIG. 7 is a time sequence showing an input packet of the RMAC unit and an output packet of the TMAC unit of a switch according to one preferred embodiment of the present invention. As shown, in input signal (c), after the RMAC unit 306 receives the packet P1, the counter 314 begins to count until the RMAC unit 306 receives the packet P2. The switch 300 records the IPG(1,2), for example 94 bit time, in the queue link node QLN(2) corresponding to the packet P2. Similarly, the switch 300 records the IPG(2,3), IPG(3,4), IPG(4,5), and IPG(5,6), for example 92, 94, 92 and 94 bit time respectively, in the queue link nodes QLN(3), QLN(4), QLN(5), and QLN(6) respectively corresponding to the packets P3, P4, P5 and P6.

The packets P1, P2, P3, P4, P5 and P6 are transmittqd out of the TMAC unit 316 after being processed by the switch 300. As shown in FIG. 7, in an output signal (c), when the packet P1 is transmitted, th packet P2 is transmitted after 96 bit time have elapsed. At this time, the IPG(1,2) obtained from the queue link node QLN(2) corresponding to the packet P2 is 94 bit time. Therefore, the TMAC unit 312 transmits the packet P3 after 94 bit time have elapsed. Similarly, because the calculated IPG(2,3), IPG(3,4) and IPG(4,5) are 92, 94, 92 bit time respectively, therefore, after the packet P3 is transmitted, the packets P4, P5 and P6 are sequentially transmitted with respective 92, 94, 92 bit time gaps. As shown in FIG. 7, the sum of all the IPGs of the adjacent packets of the packets P1, P2, . . . , P5 in the input signal (c) is equal to the sum of all the IPGs for the packets P2, P3, . . . , P6 in the output signal (c). Namely, when the input and the output speed of the switch for the packets are equal, the method is effective and efficient. As a result, no congestion occurs in the memory 308 and therefore the transmission speed for the packets increases.

It should be noticed that the method of the present invention is not restricted or limited between the switch 300 and the test device 302. The present invention is suitable for any device and the switch to receive and transmit packets.

In addition, the counter 314 in the RMAC unit 304 and the counter 316 in the TMAC unit 312 are only examples. In practice, the counters 314 and 316 are not necessary to reside in the RMAC unit 304 and the TMAC unit 312.

The method for compensating for clock signal difference between a switch and a peripheral device uses counters in the switch and modifies the fields of the queue link node to significantly improve performance. The memory overflow and data loss occurred in the conventional method can be solved and the transmission speed of the network is thus increased.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for compensating for clock signal difference between a switch and a peripheral device, the switch comprising a memory, a first counter and a second counter, the switch being used for receiving and transmitting a plurality of packets, the memory receiving the packets for temporary storage and being read for transmission of the packets, wherein each of the packets corresponds to a queue link node, an N-th packet corresponds to an N-th queue link node QLN(N) and an M-th packet corresponds to an M-th queue link node QLN(M), where N and M are integers, the method comprising:

a receiving process, the receiving process comprising the steps of:
  (a) receiving the N-th packet;
  (b) triggering the first counter;
  (c) performing a counting operation by the first counter;
  (d) proceeding to step (e) when an (N+1)-th packet is inputted to the switch, otherwise proceeding to said step (c);
  (e) stopping the first counter and then recording an inter-packet gap IPG(N, N+1) between the N-th packet and the (N+1)-th packet into the (N+1)-th queue link node QLN(N+1) according to a counting value by the first counter; and
  (f) increasing N by one and then repeating from said step (b) to said step (f); and a transmitting process, the transmitting process comprising the steps of:
  (a1) reading the M-th queue link node QLN(M) corresponding to the M-th packet for obtaining an inter-packet gap IPG(M−1, M), and then transmitting the M-th packet;
  (b1) triggering the second counter;
  (c1) performing counting operation by the second counter;
  (d1) stopping th counting operation of the second counter when a counted value by the second counter is equal to a clock cycle value corresponding to the inter-packet gap IPG(M−1, M), otherwise repeating said step (c1);

(e1) reading an (M+1)-th queue link node QLN(M+1) corresponding to an (M+1)-th packet for obtaining inter-packet gap IPG(M, M+1), and then transmitting the (M+1)-th packet; and (f1) increasing M by one and then repeating from said step (c1) to said step (f1);

wherein when the M-th and (M+1)-th packets are transmitted respectfully, an inter-packet gap between the transmitted M-th and (M+1)-th packets is based on the inter-packet gap IPG(M−1, M), which is the inter-packet gap between the received (M−1)-th and M-th packets and is recorded into the M-th QLN(M) by the receiving process, so that congestion of the memory of the switch is reduced.

2. The method of claim 1, wherein the switch further comprises a receive media access control (RMAC) unit for receiving the packets and a transmit media access control (TMAC) unit for transmitting the packets.

3. The method of claim 2, wherein the first counter is in the RMAC unit and the second counter is in the TMAC unit.

4. The method of claim 1, wherein the N-th queue link node QLN(N) comprises:
 a first field for recording a memory address for temporally storing the (N+1)-th packet;
 a second field for recording a destination port of the N-th packet;
 a third field for recording a size of the N-th packet; and
 a fourth field for recording an inter-packet gap IPG(N−1, N).

5. The method of claim 4, wherein the N-th queue link node QLN(N) further comprises a fifth field for recording a source port speed of the N-th packet.

6. The method of claim 1, wherein the N-th queue link node QLN(N) comprises:
 a first field for recording a memory address for temporarily storing the (N+1)-th packet;
 a second field for recording a destination port of the N-th packet;
 a third field for recording a size of the N-th packet; and
 a fourth field for recording a clock cycle value corresponding to 96 bit time minus the inter-packet gap IPG(N−1, N).

7. The method of claim 6, wherein the N-th queue link node QLN(N) further comprises a fifth field for recording a source port speed of the N-th packet.

8. The method of claim 1, wherein the peripheral device is a test device.

9. A method for compensating for clock signal difference between a switch and a peripheral device, the switch comprising a receive media access control (RMAC) unit for receiving a plurality of packets, a transmit media access control (TMAC) unit for receiving the packets, a first counter and a second counter, and a memory, the switch being used for receiving and transmitting a plurality of packets, the memory receiving the packets for temporary storage and being read for transmission of the packets, wherein each of the packets corresponds to a queue link node, an N-th packet corresponds to an N-th queue link node QLN(N), and an M-th packet corresponds to an M-th queue link node QLN(M), where N and M are integers, the method comprising:
 a receiving process, the receiving process comprising the steps of:
  (a) proceeding to step (b) when the N-th packet is inputted to the switch, otherwise repeating said step (a);
  (b) proceeding to step (c) when the switch completely receives the N-th packet;
  (c) triggering the first counter;
  (d) performing counting operation by the first counter;
  (e) proceeding to step (f) when an (N+1)-th packet is inputted to the switch, otherwise proceeding to said step (d);
  (f) stopping the first counter and then recording an inter-packet gap IPG(N, N+1) between the N-th packet and the (N+1)-th packet into the (N+1)-th queue link node QLN(N+1) according to a counting value by the first counter; and
  (g) increasing N by one and then repeating from said step (b) to said step (g); and
 a transmitting process, the transmitting process comprising the steps of:
  (a1) proceeding to step (b1) when an M-th packet in the switch waits to be transmitted;
  (b1) reading the M-th queue link node QLN(M) corresponding to the M-th packet for obtaining an inter-packet gap IPG(M−1, M), and then transmitting the M-th packet;
  (c1) triggering the second counter;
  (d1) performing counting operation by the second counter;
  (e1) proceeding to step (f1) when a counted value by the second counter is equal to a clock cycle value corresponding to the inter-packet gap IPG(M−1, M), otherwise repeating said step (d1);
  (f1) proceeding to step (g1) when an (M+1)-th packet in the switch waits for being transmitted, otherwise repeating said step (f1);
  (g1) stopping the counting operation of the second counter and reading an (M+1)-th queue link node QLN(M+1) corresponding to an (M+1)-th packet for obtaining an inter-packet gap IPG(M, M+1), and then transmitting the (M+1)-th packet; and
  (h1) increasing M by one and then repeating from said step (c1) to said step (h1);
 wherein when the M-th and (M+1-th packets are transmitted respectfully, an inter-packet gap between the transmitted M-th and (M+1-th packets is based on the inter-packet gap IPG(M−1, M), which is an inter-packet gap between the received (M−1)-th and M-th packets and is recorded into the M-th OLN(M) by the receiving process, so that congestion of the memory of the switch is reduced.

10. The method of claim 9, wherein the first counter is in the RMAC unit and the second counter is in the TMAC unit.

11. The method of claim 9, wherein the packets inputted to the switch are temporarily stored in the memory.

12. The method of claim 9, wherein the N-th queue link node QLN(N) comprises:
 a first field for recording a memory address for temporarily storing the (N+1)-th packet;
 a second field for recording a destination port of the N-th packet;
 a third field for recording a size of the N-th packet; and
 a fourth field for recording an inter-packet gap IPG(N−1, N).

13. The method of claim 9, wherein the N-th queue link node QLN(N) comprises:
 a first field for recording a memory address for temporally storing the (N+1)-th packet;

a second field for recording a destination port of the N-th packet;

a third field for recording a size of the N-th packet; and a fourth field for recording a clock cycle value corresponding to 96 bit time minus the inter-packet gap IPG(N−1, N).

14. The method of claim 13, wherein the N-th queue link node QLN(N) further comprise a fifth field for recording a source port speed of the N-th packet.

15. The method of claim 9, wherein the peripheral device is a test device.

16. An apparatus for transceiving a plurality of packets, wherein each of the packets corresponds to a queue link node, an N-th packet corresponds to an N-th queue link node QLN(N), and an M-th packet corresponds to an M-th queue link node QLN(M), where N and M are integrals, the apparatus comprising:

a memory receiving the packets for temporary storage and being read for transmission of the packets;

a first counter and a second counter;

a receive media access control (RMAC) unit for receiving the packets, wherein the RMAC unit is used for triggering the first counter to obtain an inter-packet gap IPG(N, N+1) between the N-th packet and the (N+1)-th packet, and then recording the inter-packet gap IPG(N, N+1) into an (N+1)-th queue link node QLN(N+1); and a transmit media access control (TMAC) unit for transmitting the packets, wherein the TMAC unit is used for reading the M-th queue link node QLN(M) corresponding to the M-th packet for obtaining an inter-packet gap IPG(M−1, M), and then transmitting the M-th packet, and then triggering the second counter, wherein when a counted value by the second counter is equal to a clock cycle value corresponding to the inter-packet gap IPG(M−1, M), an (M+1)-th queue link node QLN(M+1) corresponding to an (M+1)-th packet is read for obtaining an inter-packet gap IPG(M, M+1), and then the (M+1)-th packet is transmitted;

wherein when the M-th and (M+1)-th packets are transmitted respectfully, an inter-packet gap between the transmitted M-th and (M+1)-th packets is based on the inter-packet gap IPG(M−1, M), which is the inter-packet gap between the received (M−1)-th and M-th packets and is recorded into the M-th QLN(M) by the receiving process, so that congestion of the memory of the switch is reduced.

17. The apparatus of claim 16, wherein the first counter is in the RMAC unit and the second counter is in the TMAC unit.

18. The method of claim 16, wherein the N-th queue link node QLN(N) comprises:

a first field for recording a memory address for temporally storing the (N+1)-th packet;

a second field for recording a destination port of the N-th packet;

a third field for recording a size of the N-th packet; and a fourth field for recording the inter-packet gap IPG(N−1, N).

19. The method of claim 16, wherein the N-th queue link node QLN(N) comprises:

a first field for recording a memory address for temporally storing the (N+1)-th packet;

a second field for recording a destination port of the N-th packet;

a third field for recording a size of the N-th packet; and a fourth field for recording a clock cycle value corresponding to 96 bit time minus the inter-packet gap IPG(N−1, N).

20. The method of claim 19, wherein the N-th queue link node QLN(N) further comprises a fifth field for recording a source port speed of the N-th packet.

21. The method of claim 18, wherein the N-th queue link node QLN(N) further comprises a fifth field for recording a source port speed of the N-th packet.

22. The method of claim 12, wherein the N-th queue link node QLN(N) further comprises a fifth field for recording a source port speed of the N-th packet.

* * * * *